(12) United States Patent
Suzuki et al.

(10) Patent No.: US 10,459,218 B2
(45) Date of Patent: Oct. 29, 2019

(54) OPTICAL DEFLECTOR, IMAGE DISPLAYING APPARATUS, AND OBJECT APPARATUS

(71) Applicant: RICOH COMPANY, LTD., Tokyo (JP)

(72) Inventors: Shuichi Suzuki, Kanagawa (JP);
Tsuyoshi Hashiguchi, Kanagawa (JP);
Jun Nakagawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 216 days.

(21) Appl. No.: 15/612,259

(22) Filed: Jun. 2, 2017

(65) Prior Publication Data
US 2017/0269354 A1 Sep. 21, 2017

Related U.S. Application Data

(63) Continuation of application No. PCT/JP2015/083183, filed on Nov. 26, 2015.

(30) Foreign Application Priority Data

Dec. 8, 2014 (JP) ................................. 2014-247545

(51) Int. Cl.
*G02B 26/10* (2006.01)
*G02B 5/18* (2006.01)
(Continued)

(52) U.S. Cl.
CPC ........... *G02B 26/10* (2013.01); *G02B 5/0231* (2013.01); *G02B 5/0294* (2013.01); *G02B 5/18* (2013.01);
(Continued)

(58) Field of Classification Search
CPC .... G02B 26/10; G02B 5/0231; G02B 5/0294; G02B 5/18; G02B 26/08; G02B 26/127;
(Continued)

(56) References Cited

U.S. PATENT DOCUMENTS 5,825,022 A 10/1998 Takekoshi et al.
7,492,990 B2 2/2009 Hashiguchi et al.
(Continued)

FOREIGN PATENT DOCUMENTS

EP 1 688 776 A1 8/2006
EP 1 722 254 A2 11/2006
(Continued)

OTHER PUBLICATIONS

Office Action dated Jan. 24, 2019 in European Patent Application No. 15 867 037.2. 5 pages.
(Continued)

*Primary Examiner* — Kristina M Deherrera
(74) *Attorney, Agent, or Firm* — Xsensus LLP

(57) ABSTRACT

An optical deflector is used for optically scanning a target surface. The optical deflector includes: a mirror device configured to include a mirror capable of oscillating; and a casing configured to include a window unit for facing the mirror device, and to accommodate the mirror device. The window unit has a transmissive reflection structure in which part of an incident beam is caused to transmit through the window unit toward the mirror, and at least part of a remainder of the incident beam is reflected by the window unit to a direction separated from an optical deflection range that is deflected by the mirror device, and the transmissive reflection structure includes a diffraction grating provided on one of a front surface and a back surface of the window unit.

13 Claims, 13 Drawing Sheets

(51) Int. Cl.
*G02B 26/08* (2006.01)
*G02B 27/01* (2006.01)
*G02B 26/12* (2006.01)
*G02B 27/00* (2006.01)
*G02B 5/02* (2006.01)

(52) U.S. Cl.
CPC .......... *G02B 26/08* (2013.01); *G02B 26/127* (2013.01); *G02B 27/0018* (2013.01); *G02B 27/01* (2013.01); *G02B 26/12* (2013.01)

(58) Field of Classification Search
CPC .... G02B 26/12; G02B 27/0018; G02B 27/01; G02B 26/0833; G02B 26/105; G02B 26/1228; G02B 6/305; G11B 7/1353; G11B 7/1381
USPC ...................................................... 359/205.1
See application file for complete search history.

(56) References Cited

U.S. PATENT DOCUMENTS

| | | | |
|---|---|---|---|
| 7,529,455 B2 | 5/2009 | Suzuki et al. | |
| 7,907,317 B2* | 3/2011 | Mizoguchi | G02B 26/105 359/200.7 |
| 8,269,956 B2 | 9/2012 | Hashiguchi et al. | |
| 8,463,082 B2 | 6/2013 | Nakagawa et al. | |
| 2003/0214700 A1* | 11/2003 | Sidorin | H01S 5/146 359/334 |
| 2006/0176539 A1 | 8/2006 | Choi et al. | |
| 2006/0245317 A1 | 11/2006 | Iwata et al. | |
| 2009/0073526 A1 | 3/2009 | Uchikawa | |
| 2013/0242275 A1 | 9/2013 | Kilcher et al. | |
| 2015/0277115 A1 | 10/2015 | Inamoto et al. | |

FOREIGN PATENT DOCUMENTS

| | | |
|---|---|---|
| JP | 8-327927 A | 12/1996 |
| JP | 2002-071958 | 3/2002 |
| JP | 2005-010341 | 1/2005 |
| JP | 2006-309852 | 11/2006 |
| JP | 2007-240880 | 9/2007 |
| JP | 2009-069457 | 4/2009 |
| JP | 2011-112806 A | 6/2011 |
| JP | 2011-133530 | 7/2011 |
| JP | 2011-191625 | 9/2011 |
| JP | 2012-168184 A | 9/2012 |
| JP | 2013-155066 A | 8/2013 |
| JP | 2014-063063 | 4/2014 |
| JP | 2014-139655 | 7/2014 |
| JP | 2014-186136 | 10/2014 |
| WO | WO 2014/045751 A1 | 3/2014 |

OTHER PUBLICATIONS

International Search Report dated Feb. 2, 2016 in PCT/JP2015/083183 filed on Nov. 26, 2015 ( with English Translation).
Written Opinion dated Feb. 2, 2016 in PCT/JP2015/083183 filed on Nov. 26, 2015.
Extended European Search Report dated Oct. 24, 2017 in Patent Application No. 15867037.2.

* cited by examiner

OPTICAL DEFLECTOR, IMAGE DISPLAYING APPARATUS, AND OBJECT APPARATUS

CROSS-REFERENCE TO RELATED APPLICATIONS

The present application is a continuation application of International Application No. PCT/JP2015/083183, filed Nov. 26, 2015, which claims priority to Japanese Patent Application No. 2014-247545 filed on Dec. 8, 2014. The contents of these applications are incorporated herein by reference in their entirety.

BACKGROUND OF THE INVENTION

1. Field of the Invention

The disclosure herein generally relates to optical deflectors, image displaying apparatuses, and object apparatuses, and more particularly, to an optical deflector used for optically scanning a target surface, an image displaying apparatus including the optical deflector, and an object apparatus including the image displaying apparatus.

2. Description of the Related Art

An optical deflector package including: a mirror device with a mirror capable of oscillating; a window unit that faces the mirror device; and a casing that accommodates the mirror device is known in the related art. Such an optical deflector package is used for optically scanning the target surface (for example, see Japanese Unexamined Patent Application Publication No. 2011-191625).

In the optical deflector package, part of incident beams transmits through the window unit and then enters the mirror, but a remainder of the incident beams is reflected by the window unit.

SUMMARY OF THE INVENTION

According to an aspect of the present disclosure, an optical deflector is used for optically scanning a target surface. The optical deflector includes: a mirror device configured to include a mirror capable of oscillating; and a casing configured to include a window unit for facing the mirror device, and to accommodate the mirror device. The window unit has a transmissive reflection structure in which part of an incident beam is caused to transmit through the window unit toward the mirror, and at least part of a remainder of the incident beam is reflected by the window unit to a direction separated from an optical deflection range that is deflected by the mirror device, and the transmissive reflection structure includes a diffraction grating provided on one of a front surface and a back surface of the window unit.

DESCRIPTION OF THE PREFERRED EMBODIMENTS

The optical deflector package disclosed in Japanese Unexamined Patent Application Publication No. 2011-191625 cannot sufficiently prevent beams (stray beams) that have been reflected by the window unit, from among the incident beams, from reaching the target surface, without an increase in size of the optical deflector package.

According to one aspect of the present disclosure, the beams (the stray beams) that have been reflected by the window unit, from among the incident beams, are prevented from reaching the target surface without an increase in size.

Figure 1:
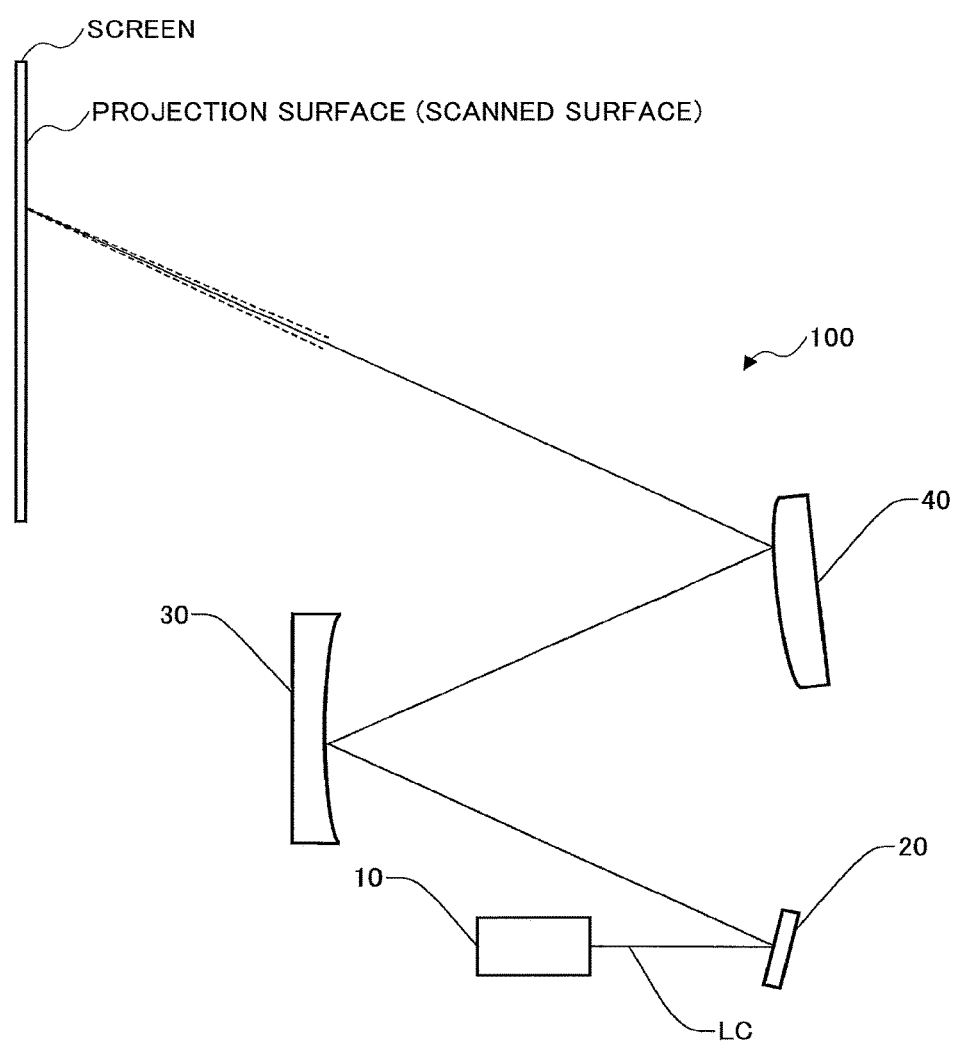
FIG. 1 schematically illustrates a general arrangement of a projector, in one embodiment.

In the following, one embodiment of the present disclosure will be described with reference to FIG. 1 to FIG. 5. FIG. 1 schematically illustrates a general arrangement of a projector 100 serving as an image displaying apparatus, in one embodiment.

The projector 100 projects beams that have been modulated in accordance with image data on a projection surface (e.g., a screen surface) to display "a two-dimensional color image".

In FIG. 1, "an optical source unit" is indicated by a numeral 10. A pixel-displaying beam LC for displaying color images is emitted from the optical source unit 10.

The pixel-displaying beam LC is a single beam line in which three-color beams of Red (hereinafter, referred to as "R"), Green (hereinafter, referred to as "G"), and Blue (hereinafter, referred to as "B") are synthesized.

Figure 2:
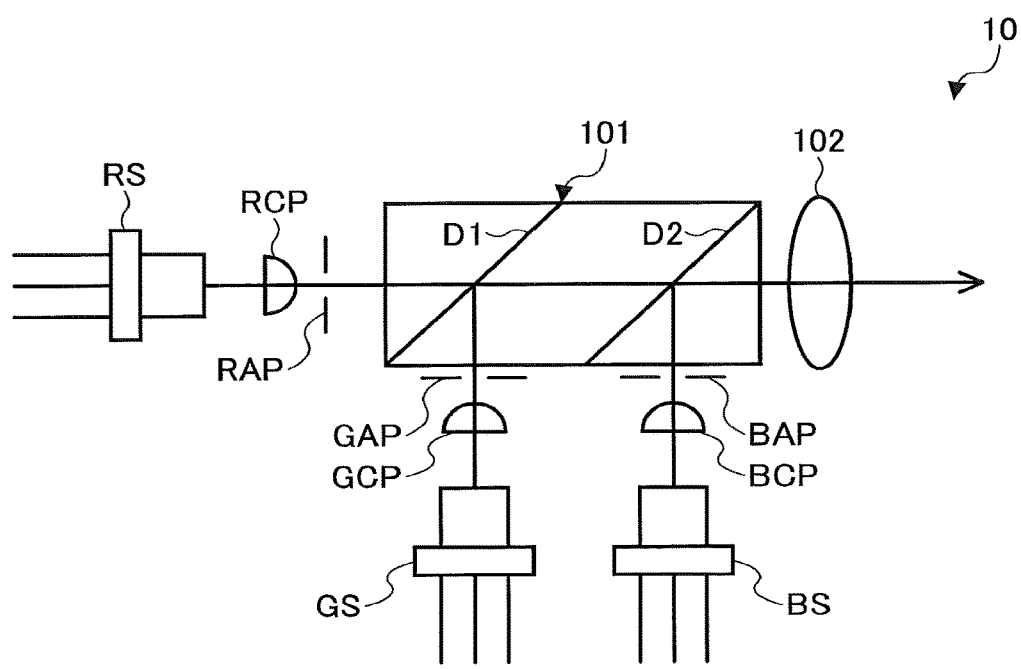
FIG. 2 is a diagram illustrating an optical source unit.

That is, the optical source unit 10 has a configuration of FIG. 2, for example.

In FIG. 2, semiconductor lasers serving as optical sources indicated by signs RS, GS, and BS respectively emit laser beams of R, G, and B. Herein, laser Diodes (LDs) also called edge-emitting lasers are used as the semiconductor lasers.

Coupling lenses indicated by signs RCP, GCP, and BCP control against divergences of the laser beams respectively emitted from the semiconductor lasers RS, GS, and BS.

Laser beam fluxes of three colors, divergences of which have been controlled against by the coupling lenses RCP, GCP, and BCP, are respectively shaped by apertures RAP, GAP, and BAP (diameters of the laser beam fluxes are regulated).

The laser beam fluxes of three colors that have been shaped enter a beam synthesizing prism 101.

The beam synthesizing prism 101 includes: a dichroic film D1 configured to transmit the laser beam of R, and to reflect the laser beam of G; and a dichroic film D2 configured to transmit the laser beams of R and G, and to reflect the laser beam of B.

Accordingly, the beam synthesizing prism 101 synthesizes the laser beam fluxes of R, G, and B into a single laser beam flux, and emits the single laser beam flux.

A lens 102 is configured to convert the emitted laser beam flux into a "parallel beam" having a given beam flux diameter.

The "parallel beam" serves as the pixel-displaying beam LC.

The laser beam fluxes of R, G, and B included in the pixel-displaying beam LC are modulated in intensity by image signals based on the image data.

Specifically, an LD driver serving as an optical source driver modulates emission intensities of the semiconductor lasers RS, GS, and BS, in accordance with the image signals of color components of R, G, and B (direct modulation). Note that instead of the direct modulation, an optical modulator may modulate the laser beams emitted from the semiconductor lasers (external modulation).

An optical deflector 20 two-dimensionally deflects the pixel-displaying beam LC that has been emitted from the optical source unit 10.

In the following description, an XYZ three-dimensional coordinate system illustrated in FIG. 3 will be referred to, as appropriate.

Figure 3:
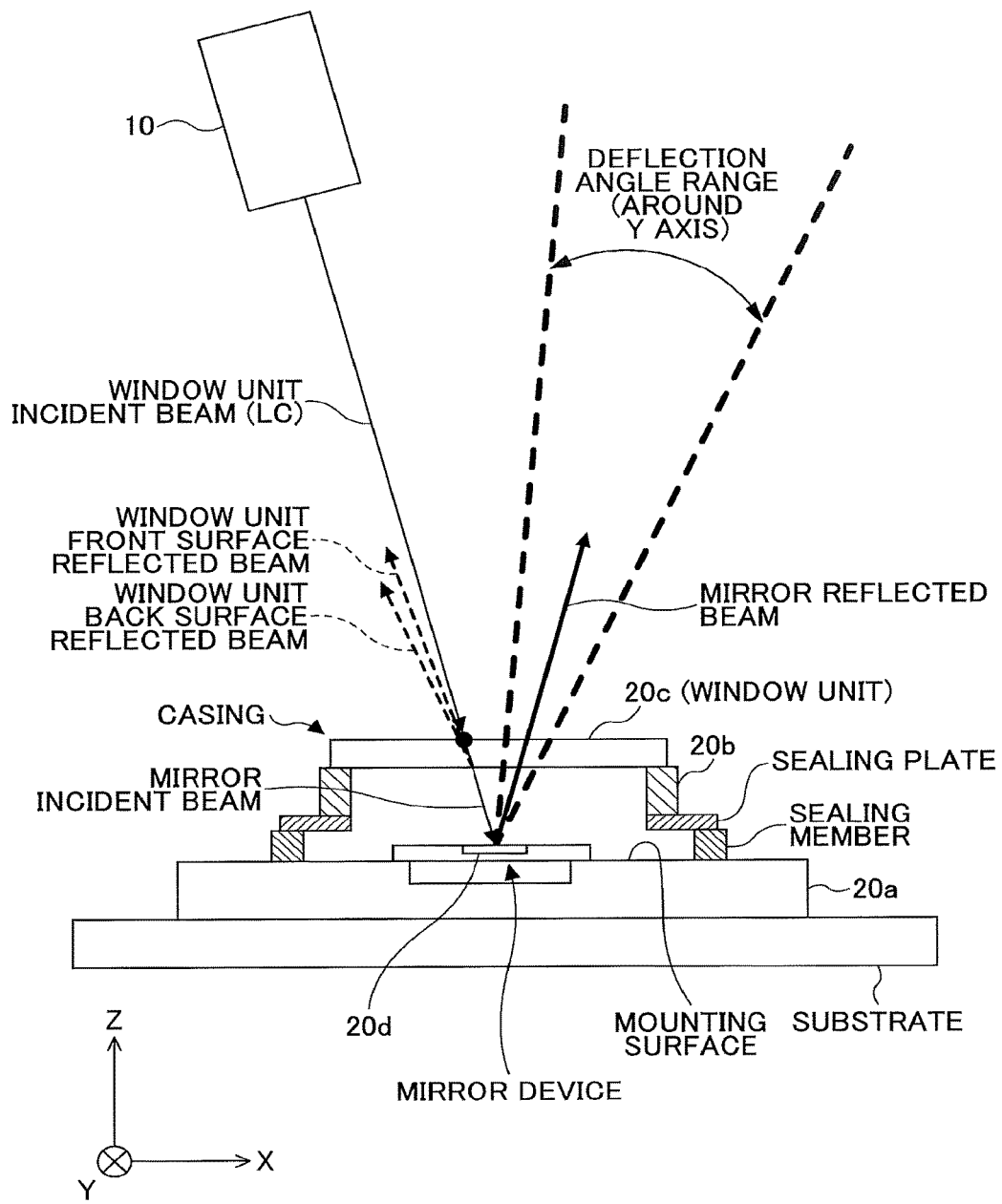
FIG. 3 is a diagram illustrating an optical deflector.

The optical deflector 20 is mounted on a substrate arranged parallel to an XY plane, as illustrated in FIG. 3. Some electronic components relating to optical deflection control are also mounted on such a substrate. The optical deflector 20 is configured to communicate control signals with a control board for integrally controlling the entire projector 100.

The optical deflector 20 includes: a casing including a package 20a, a lid 20b, and a cover glass 20c; and a mirror device (an optical deflecting element) that includes a mirror 20d (here, a MEMS mirror) and that is accommodated in the casing. Note that "MEMS" is an abbreviation of Micro Electro Mechanical Systems.

The package 20a is a flat package in which a recessed portion is formed at the center, and is mounted on the substrate. As a material of the package 20a, for example, ceramic, resin, or aluminum, is used. The package 20a includes a wiring member (not illustrated) for supplying the power to a mirror actuator (an actuator) included in the mirror device, as will be described later.

The lid 20b is configured by, for example, a metallic or ceramic tubular member that extends in the Z-axis direction. The lid 20b is joined to the package 20a via a frame-shaped sealing member and a frame-shaped sealing plate that are disposed to surround the mirror device. The length of the lid 20b in the Z-axis direction is substantially uniform in an entire area around the Z axis.

The cover glass 20c is made of a transparent or translucent glass plate. The cover glass 20c is joined through a joining material (e.g., a low-melting point glass) to an open end on the +Z side of the lid 20b to cover an opening on the +Z side of the lid 20b. That is, the cover glass 20c faces the mirror device, and is disposed substantially parallel to the XY plane. The cover glass 20c serves as a window unit of the casing.

As can be understood from the above description, the casing has a hermetically sealing structure for hermetically sealing the casing from external air. Note that the configuration of the casing can be changed as appropriate.

As one example of a sealing method for sealing the casing, here, in a nitrogen atmosphere or in a vacuum environment, the sealing member arranged on the package 20a and the sealing plate arranged at the lid 20b are joined together by seam welding. This configuration makes the mirror device less likely to be affected by an external environment even when the optical deflector 20 is placed under a high-temperature and high-humidity environment, and prevents a decrease in mirror reflection ratio and a reduction in deflection characteristic.

The cover glass 20c is located in an optical path of the pixel-displaying beam LC emitted from the optical source unit 10 to allow the pixel-displaying beam LC to enter the cover glass 20c. Part of the pixel-displaying beam LC (the incident beam) that has entered the cover glass 20c passes through the cover glass 20c, part of a remainder of the pixel-displaying beam LC is reflected by a front surface (a surface on the +Z side) of the cover glass 20c, and another part of the remainder of the pixel-displaying beam LC is reflected by a back surface (a surface on the −Z side) of the cover glass 20c. The pixel-displaying beam LC enters the cover glass 20c diagonally on the −X side and on the +Z side. Hereinafter, the pixel-displaying beam LC that enters the cover glass (window unit) 20c is also referred to as "a window unit incident beam". Part of the window unit incident beam reflected by the front surface of the cover glass 20c is referred to as "a window unit front surface reflection beam". Part of the window unit incident beam reflected by the back surface of the cover glass 20c is referred to as "a window unit back surface reflection beam".

The mirror device serves as a two-axis scanner including the MEMS mirror (the mirror 20d), and is mounted on a surface on the +Z side (on a plane parallel to the XY plane) of the package 20a by, for example, die bonding to cover the recessed portion of the package 20a. Specifically, the recessed portion of the package 20a serves as an oscillating space of the mirror 20d. By accommodating the mirror device in the casing having the hermetically sealing structure, as described above, the mirror device is shielded from the external air. Note that the mirror device may be a two-axis scanner including, for example, a galvano mirror.

The mirror 20d is disposed in the optical path of the beam that has passed through the cover glass 20c, from among the pixel-displaying beams LC (the window unit incident beams) incident to the cover glass 20c. Additionally, the mirror 20d is configured to be capable of oscillating independently around X and Y axes. Hereinafter, the beam that has passed through the cover glass 20c and is then incident to the mirror 20d is referred to as "a mirror incident beam". The beam that has been reflected by the mirror 20d is referred to as "a mirror reflection beam".

Figure 4:
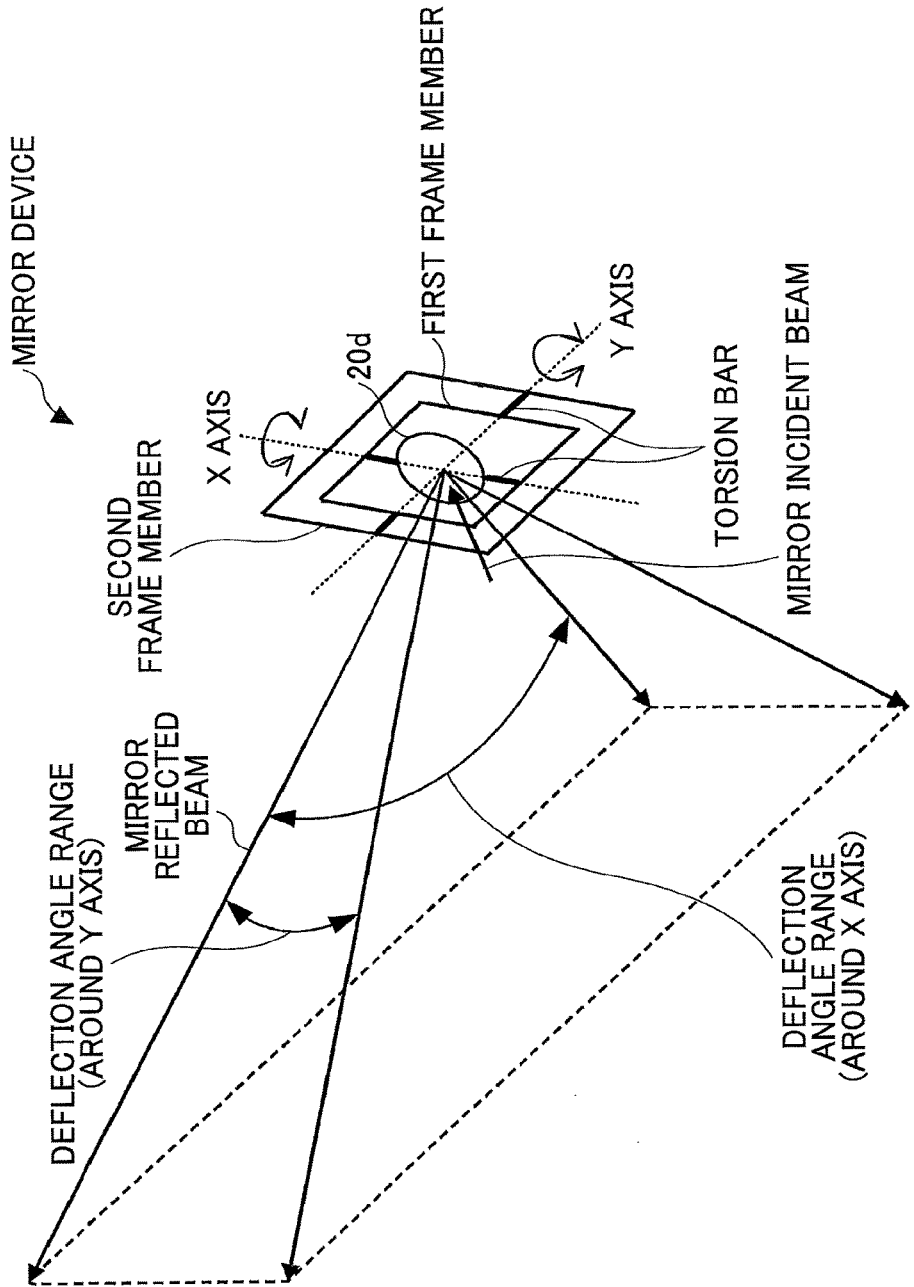
FIG. 4 is a diagram illustrating a mirror device of the optical deflector.

In detail, as illustrated in FIG. 4, the mirror 20d is supported via torsion bars by a first frame member, so as to be capable of oscillating in the X axis in the inside of the first frame member. The first frame member is supported via torsion bars by a second frame member, so as to be capable of oscillating in the Y axis in the inside of the second frame member. The mirror 20d is configured to be actuated by the mirror actuator independently in a first oscillating range in the X axis and in a second oscillating range in the Y axis. The second frame member is supported by the package 20a. Here, the first oscillating range is set to be larger than the second oscillating range. Note that the configuration in which the mirror 20d is made to oscillate on X and Y axes independently is illustrated as one example, and can be changed as appropriate. In FIG. 4, illustration of the casing is omitted.

Various types of methods have been proposed for the mirror actuator. Such methods include: a method (electrostatic method) for utilizing an electrostatic force generated between comb-shaped electrodes arranged on the periphery of the mirror; a method (electromagnetic method) for utilizing a Lorentz force generated between an electromagnet arranged in the vicinity of the mirror and an electric current that flows through wiring having a layout to surround the mirror, and a method (piezoelectric method) for utilizing a contraction of a thin film generated by applying a voltage to the piezoelectric thin film arranged in the vicinity of the mirror. In any of the above-described methods, a micro mirror (the MEMS mirror) enables scanning at high speed. Such a micro mirror (the MEMS mirror) is arranged for an element size of about several-millimeter squared, with a diameter of about one millimeter to several millimeters.

Then, the part of the pixel-displaying beam LC emitted from the optical source unit 10 that has passed through the cover glass 20c is incident to the mirror 20d. The beam that has been incident to the mirror 20d is deflected (reflected) to a direction corresponding to positions on X and Y axes of the mirror 20d (toward the cover glass 20c), and at least part of the beam passes through the cover glass 20c. Such at least part of the beam that has passed through the cover glass 20c will become the beam that has been emitted from the optical deflector 20. Here, in the cover glass 20c, an area that is irradiated (scanned) with the mirror reflection beam is arranged on the +X side with respect to an incident position that is irradiated with the window unit incident beam (see FIG. 3).

A deflected beam (the mirror reflection beam) that has been deflected by the optical deflector 20 is reflected by a concave mirror 30, and the optical path is turned at the concave mirror 30. The concave mirror 30 is designed to correct a curve occurring in a scanning line (a scan trajectory) on the projection surface (the screen surface, here).

The beam is reflected by the concave mirror 30, is then reflected by a convex mirror 40, so that the optical path is turned at the convex mirror 40. The convex mirror 40 enlarges and reflects the beam that has been reflected by the concave mirror 30 towards the projection surface.

Consequently, the projection surface is two-dimensionally scanned by the beam (the pixel-displaying beam LC), and a two-dimensional color image is created on the projection surface. Therefore, the projection surface may also be referred to as "a target surface".

In this situation, for example, by oscillating the mirror 20d in the Y axis with a low-frequency saw-tooth voltage while oscillating the mirror 20d in the X axis with a high-frequency sinusoidal voltage, an image rendering area (an image displaying area) on the target surface can be raster-scanned. Specifically, while being scanned at high speed in a to-and-fro manner in a main-scanning direction corresponding to an oscillating direction in the X axis, the image rendering area can be scanned at low speed in one way in a sub-scanning direction corresponding to an oscillating direction in the Y axis.

The image rendering area is configured to have, for example, a substantially rectangular shape, such that a longer direction is set to the main-scanning direction and a shorter direction is set to the sub-scanning direction.

The optical deflector 20 is produced by sequentially performing a process (a MEMS process) for mounting the mirror 20d onto the package 20a, and a process (a sealing process) for joining the lid 20b, to which the sealing member is attached, and the cover glass 20c to the package 20a, to which the sealing member is attached.

Typically, a glass plate is used for the window unit of the casing configured to accommodate the mirror device, in the optical deflector. Hence, in a case where the mirror arranged at a center portion of the oscillating range and the window unit are parallel to each other, reflected beams that have been reflected by the front and back surfaces, from among the incident beams that have been incident to the window unit, travel in directions that are substantially same as (or proximate to) a travelling direction of the beam that has been reflected by the mirror arranged at the center portion of the oscillating range, after having passed through the window unit. In such a case, the beams (the stray beams) that have been reflected by the window portion will ordinarily irradiate the image rendering area where an image is rendered on the projection surface by the optical scanning, and hence the contrast of the image will be reduced.

Specifically, the stray beam occurring from the laser beams emitted from the semiconductor lasers has a high intensity due to its directional characteristic, and is therefore easily visible. Once the stray beam that is not deflected (a stationary beam) occurs, even a small amount of stray beam is relatively brighter than a laser beam (a dynamic beam) that has been deflected by the optical deflector 20. Hence, the stray beam is made visible, and the contrast of the image will be reduced.

In order to prevent such a contrast reduction and to improve the optical utilization efficiency, antireflection coating is often applied on the front and back surfaces of the glass plate. However, it might be difficult to produce at a low cost an antireflection film with the lowered contrast that is sufficiently small to be ignored. For example, in a laser scanning type of image forming apparatus, the performance in the contrast is demanded to be about 1:10000. To achieve this performance, a reflection rate at the window unit needs to be 0.001% or less. An extremely high-quality antireflection structure, for example, an antireflection film having an extremely large number of layers would need to be formed.

Therefore, in the present embodiment, as will be described later in detail, for example, a fine periodic pattern structure is applied on the front surface (the surface on the +Z side) of the cover glass 20c serving as the window unit. Hence, the beam reflected by the front surface of the window unit, from among the incident beams that have entered the window unit, is diffracted as illustrated in FIG. 3, so as to guide at least part of the reflection beam to be separated from an optical deflection range within which the incident beams that have been deflected by the mirror device travel (more specifically, to be separated from an optical deflection angle range in the Y axis). Consequently, the beam that has been reflected by the front surface of the window unit is prevented from reaching the image rendering area (the target surface), and the contrast reduction is prevented. Note that the "optical deflection angle range of the beams deflected by the mirror device" means an area defined by optical deflection angle ranges on X and Y axes created by the mirror device. In other words, the "optical deflection angle range of the beams deflected by the mirror device" means the area through which given beams that have been deflected by the mirror device pass.

Moreover, by additionally applying, for example, the fine periodic pattern structure on the back surface (surface on the −Z side) of the cover glass 20c, the beam that has been reflected by the back surface of the window unit, from among the incident beams that have entered the window unit, is prevented from reaching the image rendering area (the target surface).

In this situation, a transmitting angle of the beam that transmits through the inside of the window unit is slightly different from the incident angle (hereinafter, also referred to as a window unit incident angle) of the incident beam that is incident to the window unit, because of refraction by the front surface of the window unit. Hence, diffraction angles of the front surface and back surface of the window unit may be differentiated from each other depending on a difference between the transmitting angle and the incident angle. For example, in FIG. 5, the diffraction angles on the front and back surfaces of the window unit are set such that the window unit incident angle and the mirror incident angle are equal to each other.

The fine periodic pattern structure is desirably applied (formed) on at least one of the front surface and the back surface of the window unit.

Figure 5:
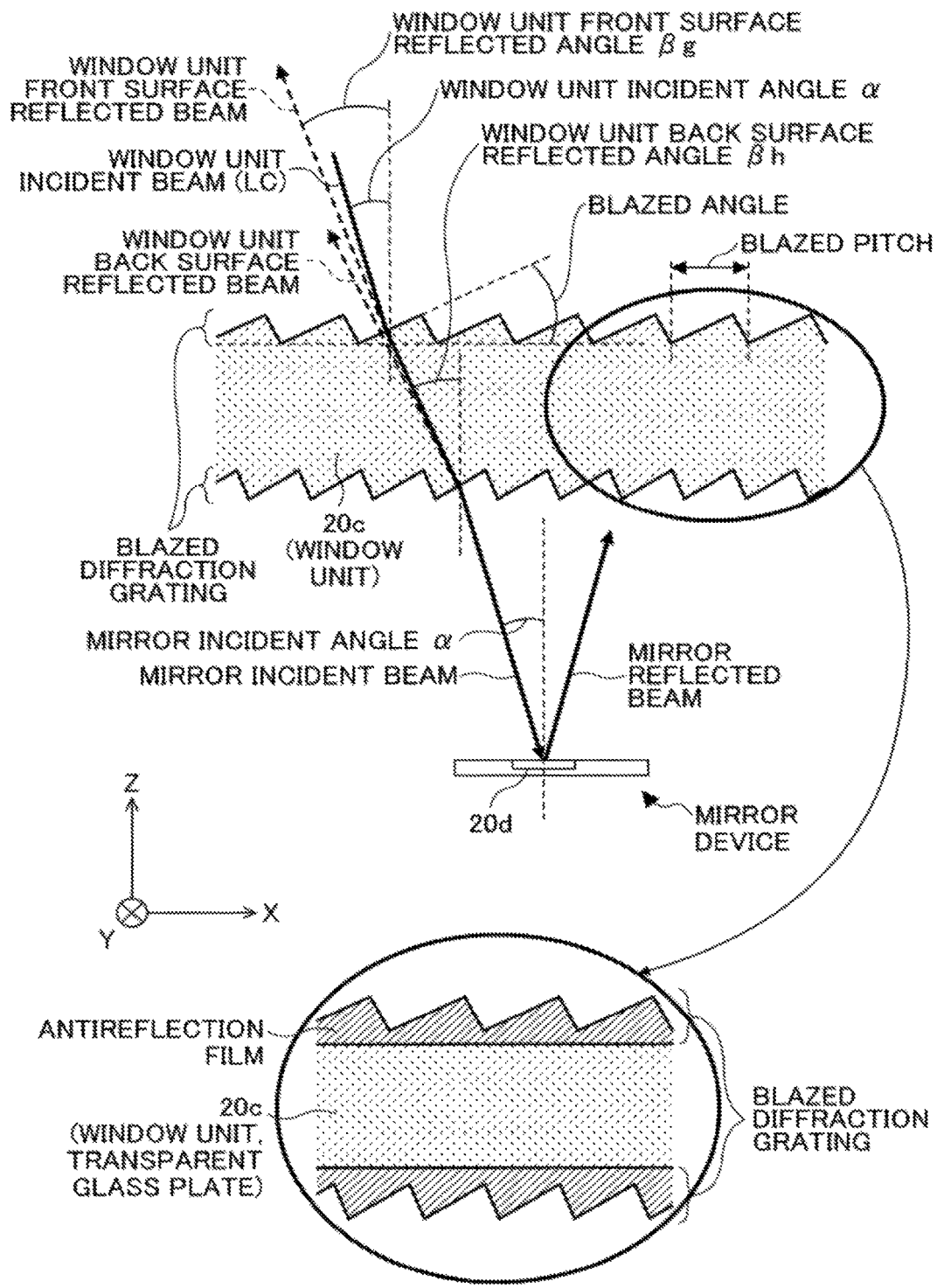
FIG. 5 is a diagram illustrating a window unit of the optical deflector.

FIG. 5 illustrates a blazed diffraction grating (a diffraction grating having a blazed structure), as one example of the fine periodic pattern structures. The blazed diffraction gratings are respectively arranged on the front and back surfaces of the cover glass 20c serving as the window unit.

Note that diffracting of the beams reflected by the window unit as described above is enabled by forming a blazed diffraction grating having, for example, a saw-tooth cross-sectional shape on at least one of the front surface and the back surface of the window unit (the glass plate).

When an incident beam and an m-order diffracted beam have a specular reflection relationship with respect to a predefined blazed angle $\theta_B$, most of the optical components are integrated to such an m-order diffracted beam. Accordingly, the predefined blazed angle $\theta_B$ of the blazed diffraction grating formed on the front surface of the window unit can be calculated by following Expression (1), where $\alpha$ is a window unit incident angle, $\beta g$ is a reflection angle of the beam that has been reflected by the front surface of the window unit (hereinafter, also referred to as a window unit front surface reflection angle).

⟨Expression 1⟩

$$\theta_B = \frac{\alpha + \beta_g}{2} \quad (1)$$

A blazed pitch d of the blazed diffraction grating can be calculated by following Expression (2), where $\lambda$ is a wavelength of the incident beam.

⟨Expression 2⟩

$$d = \frac{m \cdot \lambda}{2\sin(\theta_B)\cos(\alpha - \theta_B)} [\text{rad}] \quad (2)$$

For example, when the window unit incident angle $\alpha$ is 15 degrees, the window unit front surface reflection angle $\beta g$ is 17 degrees, $\lambda$ is 440 nm, and m is 1, calculation results that the blazed angle $\theta_B$ is 16 degrees and the blazed pitch d is 800 nm are obtained by above Expressions (1) and (2). In this situation, most of the beams reflected by the window unit are integrated with a first diffraction beam where the reflection angle ($\beta g$) is 17 degrees.

Regarding the blazed diffraction grating formed on the back surface of the window unit, a blazed angle and the blazed pitch can be calculated by replacing $\beta g$ (the window unit front surface reflection angle) in the above Expression (1) with a reflection angle $\beta h$ (hereinafter, also referred to as a window unit back surface reflection angle) of the beam that has been reflected by the back surface of the window unit.

In FIG. 5, the blazed diffraction grating provided on the front surface of the window unit and the blazed diffraction grating provided on the back surface of the window unit are different from each other in the blazed angle (the diffraction angle) and in the blazed pitch. However, the blazed diffraction gratings are not limited to the above-described ones, and can be modified as appropriate. For example, the blazed diffraction gratings provided on the front and back surfaces of the window unit may be the same with each other in the blazed angle and in the blazed pitch, may be different from each other in the blazed angle only, or may be different from each other in the blazed pitch only.

In a case where the image forming apparatus (e.g., projector) renders a color image, three kinds of laser beam wavelengths corresponding to R, G, and B are used. However, by designing the blazed diffraction grating so that a desired diffraction angle for the shortest wavelength of B (the wavelength is 440 nm) is available, the laser beams of R and G having longer wavelengths are reflected by the window unit at enlarged diffraction angles. For example, in the above numerical example, the laser beam of R having a wavelength of 640 nm is diffracted at 33 degrees. The beams reflected by the window unit are prevented from reaching the image rendering area. Specifically, when determining a blazed structure of scanning the target surface with laser beams having a plurality of wavelengths, the blazed structure can be designed in accordance with the laser beam having the shortest wavelength.

The blazed diffraction grating can be produced by the following method, for example. According to a photolithographic technique such as a holographic exposure method that utilizes dual flux interference of laser beams, a photoresist layer with a film thickness distribution is formed. By using such a photoresist layer as a mask, the front and back surfaces of a glass plate are etched according to a technique such as an ion beam etching. Consequently, the periodic saw-tooth shape (the blazed shape) can be formed on the window unit. Additionally, films each including a transparent polymer material may be formed on the front and back surfaces of the window unit, and the blazed shape may be patterned on each of the films in a similar method. Further, by producing a master plate on which the blazed shape is engraved, and pressing the master plate on a polymer thin film formed on each of the front and back surfaces of the window unit to transfer the blazed pattern, the blazed diffraction gratings can also be applied (formed) easily on the front and back surfaces of the window unit.

As described heretofore, the optical deflector 20 in one embodiment includes: a mirror device configured to include the mirror 20d capable of oscillating; and a casing configured to include a window unit for facing the mirror 20d, and to accommodate the mirror device. The window unit has a transmissive reflection structure (e.g., the fine periodic pattern structure) that allows part of the incident beam to pass through the window unit and that reflects part of the remainder of the incident beam in a direction separated from the optical deflection range within which the beams that have been deflected by the mirror device travel.

In such a case, a travelling direction (a moving direction) of at least part of the beam reflected by the transmissive reflection structure is separated from the optical deflection range within which the beams that have been deflected by the mirror device travel, without tilting the window unit of the casing with respect to the surface (a mounting surface) on which the mirror device is mounted, in the casing.

In detail, in the optical deflector 20, the fine periodic pattern structures (e.g., the blazed diffraction gratings) are respectively provided on the front and back surfaces of the window unit of the casing for accommodating the mirror device. Each of the fine periodic pattern structures has an optical diffraction effect such that the travelling direction (a reflection direction) of at least part of the beams reflected by the front and back surfaces of the window unit can be set to a predefined direction. In other words, by designing the fine periodic pattern structures, the travelling directions of at least part of the beams reflected by the front and back surfaces of the window unit can be set to be separated from the optical deflection range within which the beams that have been deflected by the mirror device travel.

Accordingly, even in a case where the casing is designed such that the window unit is substantially parallel to the mounting surface, at least part of the beam reflected by the window unit is guided to be separated from the optical deflection range within which the beams that have been deflected by the optical deflector 20 travel. Hence, the stray beams occurring at a rendered image (a projected image) are eliminated or minimized. Further, the window unit and the mirror device can be arranged to be proximate to each other by making the window unit substantially parallel to the mounting surface. This configuration enables prevention of an increase in size of the optical deflector 20, and therefore enables prevention of an increase in size of the image displaying apparatus (i.e., the projector 100).

Consequently, without an increase in size of the optical deflector 20, part of the incident beam (the stray beam) reflected by the window unit is prevented from reaching the target surface.

Hence, a reduction in image contrast is prevented by adopting the optical deflector 20 for the image displaying apparatus (i.e., the projector 100).

In contrast, Japanese Unexamined Patent Application Publication No. 2011-191625 discloses a configuration in which an antireflection structure having a parabolic concavo-convex structure is applied to an optical transmissive window of a hermetically sealed package in an optical deflector including a micro mirror.

The parabolic concavo-convex structure disclosed in Japanese Unexamined Patent Application Publication No. 2011-191625 is limited to a function as an alternative for the antireflection coating that prevents reflection on the surface of the optical transmissive window, and does not influence the travelling directions of the beams reflected by the optical transmissive window. Therefore, the beams reflected by the optical transmissive window will enter a beam-scanning range (a deflection range) of the beams deflected by the optical deflector. Even with the provision of the antireflection structure on the optical transmissive window, it is difficult to completely eliminate reflection beam components. In the image forming apparatus for which a high-contrast performance is particularly demanded, even a small amount of beams reflected by the optical transmissive window could become stray beams, which will reduce the image contrast.

Figure 6:
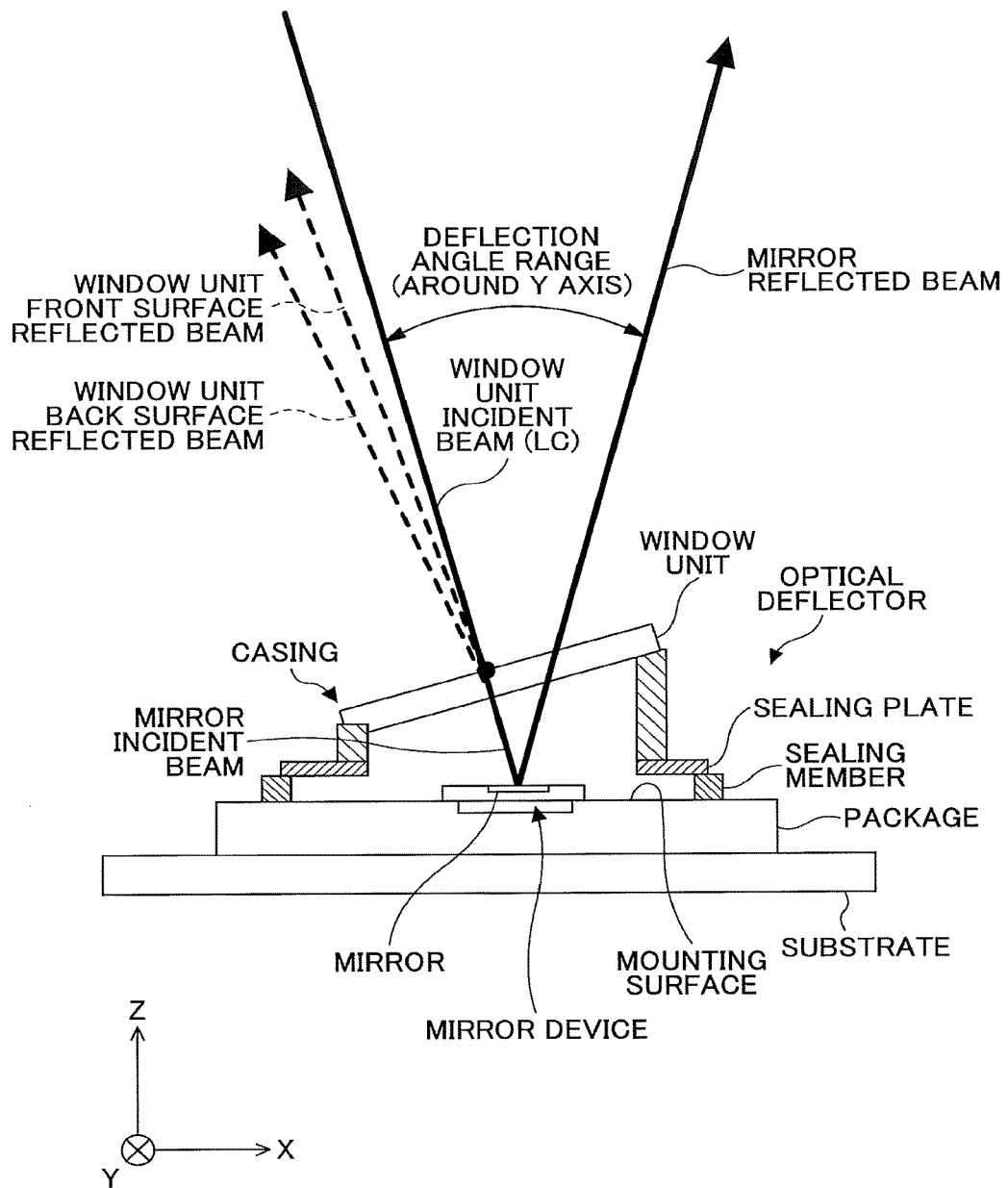
FIG. 6 is a diagram illustrating an optical deflector in a comparative example.

As a comparative example illustrated in FIG. 6, by tilting the window unit by a given angle (15 degrees to 45 degrees in FIG. 6) with respect to the mounting surface on which the mirror device is mounted, at least part of the travelling directions of the window unit front surface reflection beam and the window unit back surface reflection beam can be separated from the optical deflection range within which the beams that have been deflected by the mirror device travel. However, in the comparative example, the size of an optical deflector will be increased.

Since the diffraction gratings, which are the fine periodic pattern structures, are provided on the front and back surfaces of the window unit of the casing, even when the incident position of the incident beam at the window unit shifts in some degree, at least part of the reflection directions (the travelling directions) of the window unit front surface reflection beam and the window unit back surface reflection beam is separated from the optical deflection range within which the beams that have been deflected by the mirror device travel.

Optical paths of the beams reflected by the transmissive reflection structure (the window unit front surface reflection beam and the window unit back surface reflection beam) extend on an opposite side of the optical deflection range within which the beams that have been deflected by the mirror device travel, with respect to the optical path of the incident beam (the window unit incident beam). Therefore, the beams (the stray beams) reflected by the window unit are certainly prevented from reaching the target surface.

The projector 100 is an image displaying apparatus configured to scan the target surface with the beams for displaying an image. The projector 100 includes: the optical source unit 10 configured to emit the beam based on image information data; and the optical deflector 20 configured to deflect the beam emitted from the optical source unit 10. This configuration enables the projector 100 to display high-contrast images.

Figure 7:
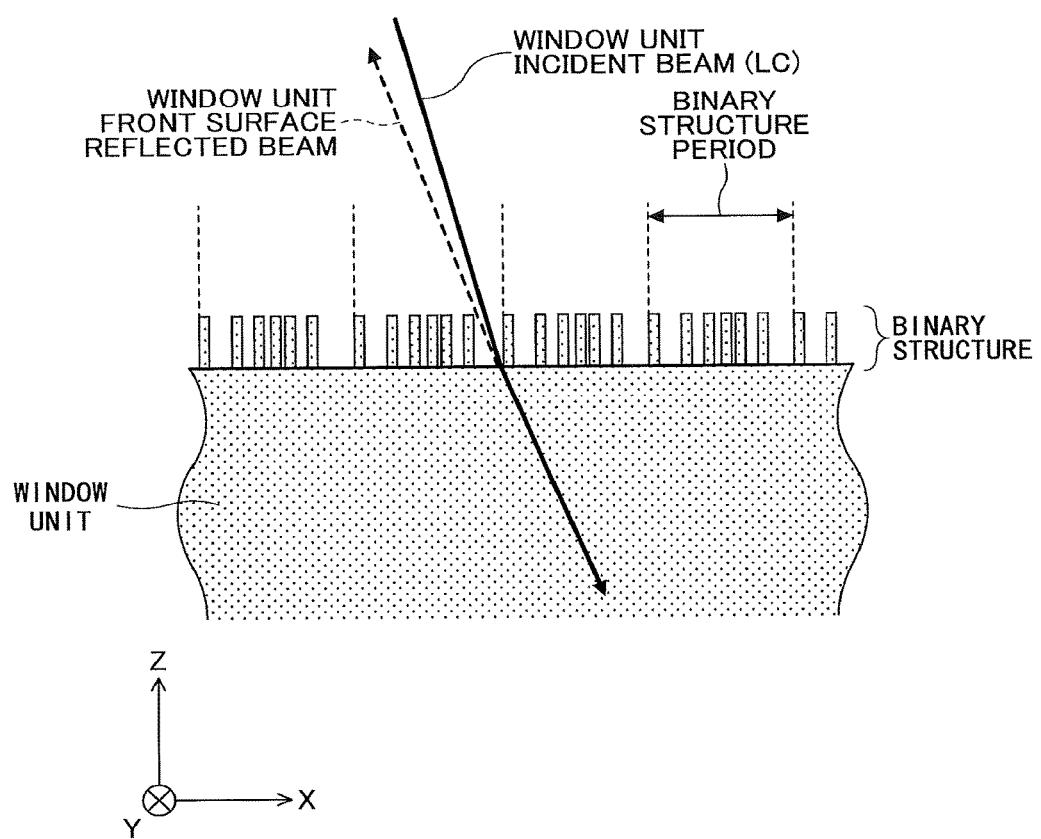
FIG. 7 is a diagram illustrating a window unit in Variation 1.

FIG. 7 schematically illustrates a window unit of an optical deflector in Variation 1. As described above, the beams reflected by the window unit can be diffracted by applying the blazed diffraction gratings on the window unit. However, in order to further improve the productivity and to make the same effect available at a low cost, it is advantageous to utilize a diffraction grating having a binary structure (a binary diffraction grating) to obtain a similar refractive-index distribution to the blazed diffraction grating.

Here, as illustrated in FIG. 7, the "binary structure" is configured by forming, for example, a projection and recess structure with a constant height difference on a surface of the window unit, such that respective linear widths of projecting portions and recessed portions in such a projection and recess structure are set to have given sizes. By utilizing such a binary structure, the refractive-index distribution equivalent to the refractive-index distribution of the blazed diffraction grating is made available by the window unit.

In a case where, for example, the binary structure is provided on a glass plate surface, as the widths of the projecting portions are increased, a glass material ratio included in a unit area is increased. An equivalent refractive index of the glass plate surface approaches the refractive index of the glass material. Conversely, as the widths of the projecting portions are reduced, the glass material ratio included in the unit area is reduced. The equivalent refractive index of the glass plate surface gets closer to the refractive index of an atmosphere (the air or a sealing gas) at the window unit. Hence, by aligning a plurality of projecting portions while gradually changing the widths of the projecting portions, the refractive-index distribution that is the same as the refractive-index distribution of one period of the blazed structure is achieved. Then, by arranging a plurality of groups of binary structures in a given binary structural period, the same effect as the blazed diffraction grating is made available consequently.

Similarly, the binary structure can be arranged on the window unit back surface (e.g., the back surface of the glass plate). Also in this case, the same functions and advantages are made available.

That is to say, the binary structure may be provided on at least one of the front surface and the back surface of the window unit.

In a case where the binary structures are respectively provided on the front and back surfaces of the window unit, the diffraction angles and the binary structural periods may be the same with each other, or may be different from each other between the front surface and the back surface.

The linear width in the binary structure can be controlled to be a fine width, such as 100 nm or less. In addition, since the binary structure can be formed in a producing process while keeping an etching depth constant, the beams reflected by the window unit can be diffracted through a simpler producing process than the process for applying the blazed structure.

The above-described blazed structure or the above-described binary structure may be applied (formed) directly on the glass plate serving as a base material of the window unit. After the antireflection film is formed by applying the antireflection coating on at least one of the front surface or the back surface of the glass plate, the above-described blazed structure or the above-described binary structure may be formed on the antireflection film, as shown in FIG. 5. This configuration enables a reduction in the optical components reflected by the window unit, and also enables minimization of an influence on the rendered image (the projected image) by guiding at least part of the occurring reflection beams to be separated from the optical deflection range within which the beams that have been deflected by the mirror device travel. To be specific, since the amount of beams reflected by the window unit is reduced, even if the reflection beams are further reflected by a component part in the apparatus or by an inner wall of a housing and reach the target surface, influences of the further reflection beams are minimized.

Figure 8A:
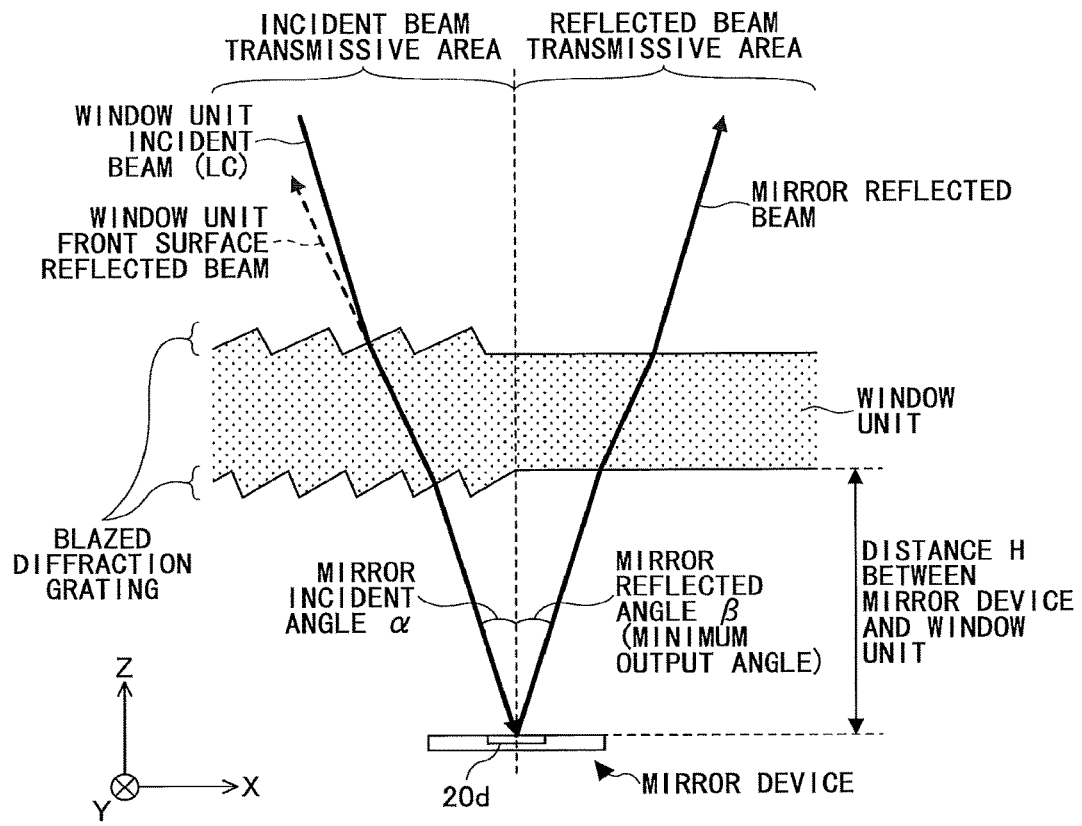
FIG. 8A is a diagram illustrating an optical deflector in Variation 2.

FIG. 8A illustrates an optical deflector in Variation 2, in which illustrations of component elements are partially omitted. In such an optical deflector, the diffraction grating (e.g., the blazed diffraction grating) is applied on an area in the window unit through which the incident beam (the window unit incident beam) passes (is irradiated), but no diffraction grating is arranged on another area in the window unit through which the beams (the mirror reflection beams) reflected by the window unit pass (are irradiated). Also in Variation 2, the diffraction angles of the diffraction gratings provided on the front and back surfaces of the window unit are configured such that the window unit incident angle and the mirror incident angle are equal to each other.

The optical components of the beams that have been reflected by the window unit, from among the incident beams, affect the contrasts of images to be rendered by the image forming apparatus. For this reason, by applying the diffraction grating to at least the area in the window unit through which the incident beam passes (is irradiated), the stray beams are prevented from entering the optical deflection range within which the beams that have been deflected by the mirror device travel.

In addition, another area in the window unit through which the mirror reflection beam passes (is irradiated) is configured by a typical flat area. This configuration eliminates or minimizes any excessive wavefront distortions, as compared to the case where the mirror reflection beams pass through the diffraction grating. In other words, beam distortions occurring in the optical deflector are minimized.

Figure 8B:
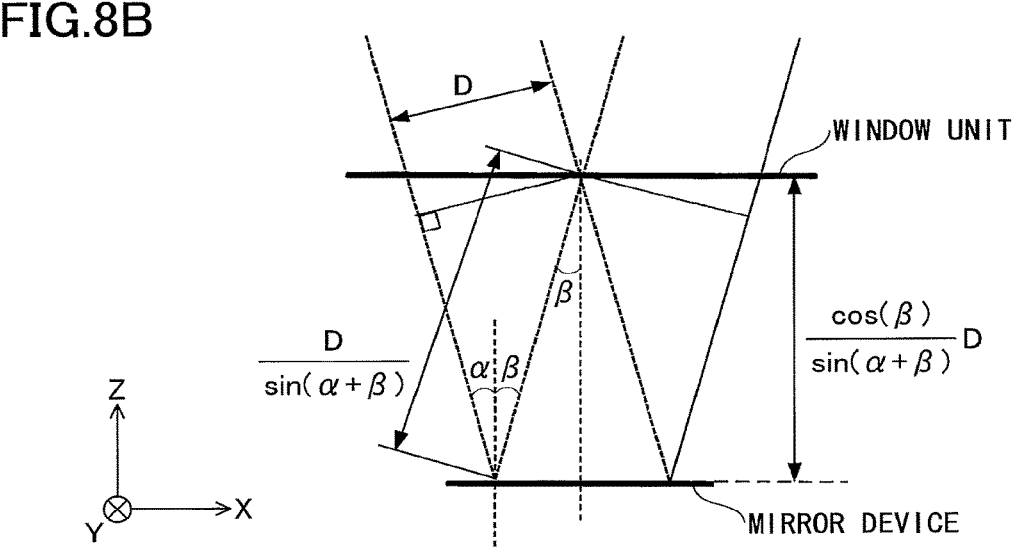
FIG. 8B is another diagram illustrating the optical deflector in Variation 2.

In Variation 2, the incident beam (the window unit incident beam) that enters the optical deflector and the beam reflected by the mirror device (the mirror reflection beam) are desired to irradiate the window unit separately from each other. In order to create such a situation, the distance between the mirror device and the window unit is configured to have a certain degree of length. To be specific, as in a schematic diagram illustrated in FIG. 8B, a distance H for separating the window incident beam and the mirror reflection beam from each other can be calculated by following Expression (3), where α is a window unit incident angle, β is a minimum output angle of the mirror reflection beam, and D is a beam diameter of the optical beam (the window unit incident beam). Note that "the minimum output angle" means an angle between the Z axis of the mirror device and an edge line on the −X side in the deflection angle range around the Y axis. "The minimum output angle" may also be called "a minimum reflection angle".

⟨Expression 3⟩

$$H > \frac{\cos(\beta)}{\sin(\alpha + \beta)} D \qquad (3)$$

As a specific example, in a case where an optical beam having a diameter D of 1 mm is incident at an incident angle of 15 degrees the mirror device including the mirror 20d that oscillates in the Y axis with a mechanical oscillating angle +−5 degrees, the minimum output angle of the beam reflected by the mirror device is 5 degrees. H>2.91 mm is obtained by assigning α=15 degrees, D=1 mm, and β=5 degrees in Expression 3. That is, the casing can be designed such that the distance between the mirror device and the window unit is longer than 2.91 mm.

Note that the transmissive reflection structure can be formed in at least the area in the window unit through which the incident beam passes.

In the descriptions in the above embodiments and variations, the window unit is configured to be substantially parallel to the mounting surface on which the mirror device of the package is mounted. However, for example, for purposes of facilitating the design of the blazed diffraction grating and reducing the distance between the mirror device and the window unit as in Variation 2 illustrated in FIG. 8A and FIG. 8B, the window unit may be configured to tilt at a small angle (e.g., smaller than 15 degrees, preferably smaller than 10 degrees, or more preferably smaller than 5 degrees) with respect to the mounting surface.

Figure 9:
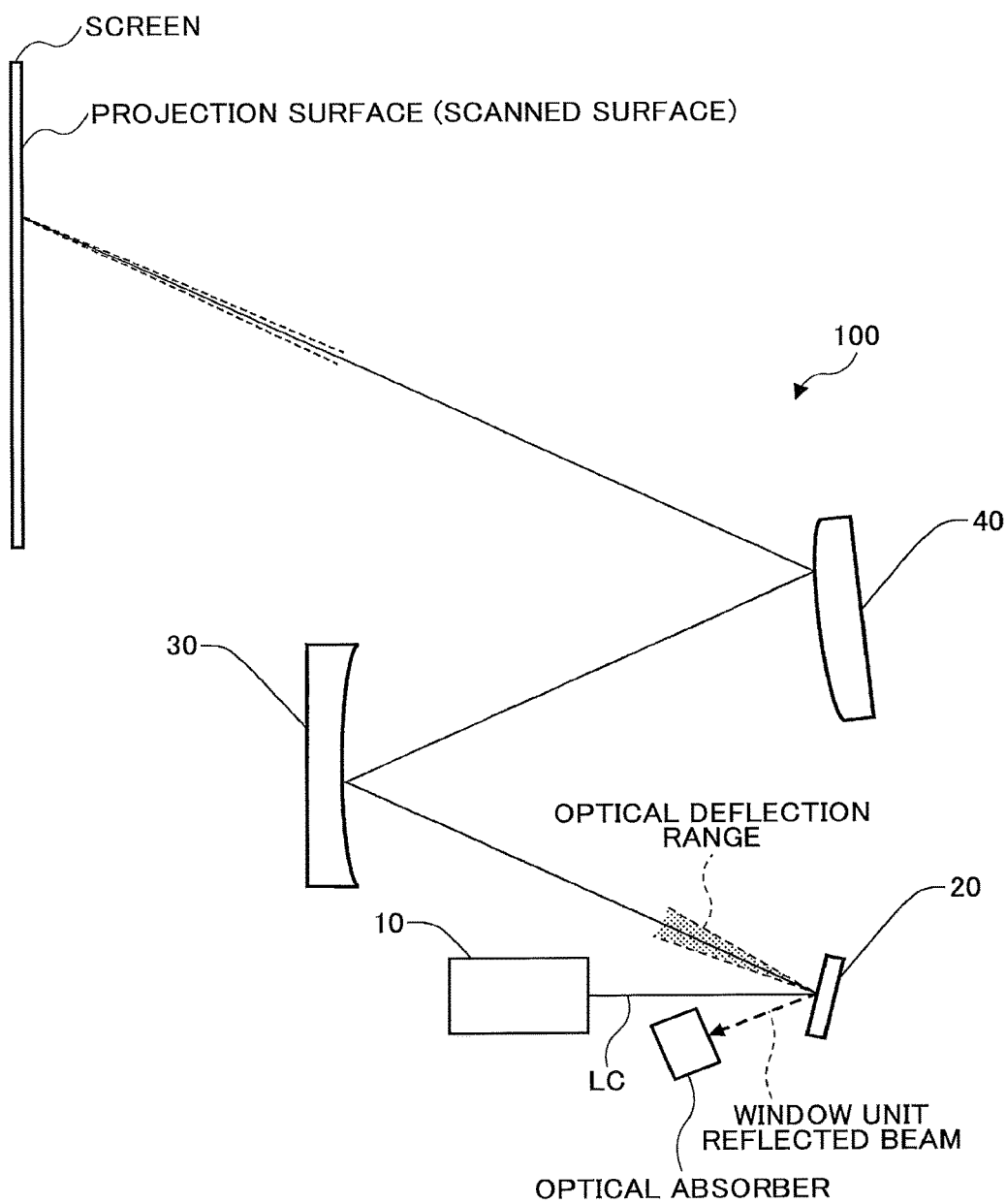
FIG. 9 is a diagram illustrating a projector in Variation 3.

In Variation 3 illustrated in FIG. 9, an optical absorber (a light shield) is provided in an optical path of the beam reflected by the window unit (a window unit reflection beam) to absorb the window unit reflection beam. In such a case, the optical components reflected by the window unit are prevented from becoming stray beams and from reaching the image rendering area. In addition, the optical components reflected by the window unit are prevented from returning to the optical source unit 10. Note that if the window unit reflection beam returns to the semiconductor laser, the laser oscillation of the semiconductor laser will be unstable and output fluctuations will occur. As a result, it will be impossible to scan the target surface in a stable manner.

Figure 10:
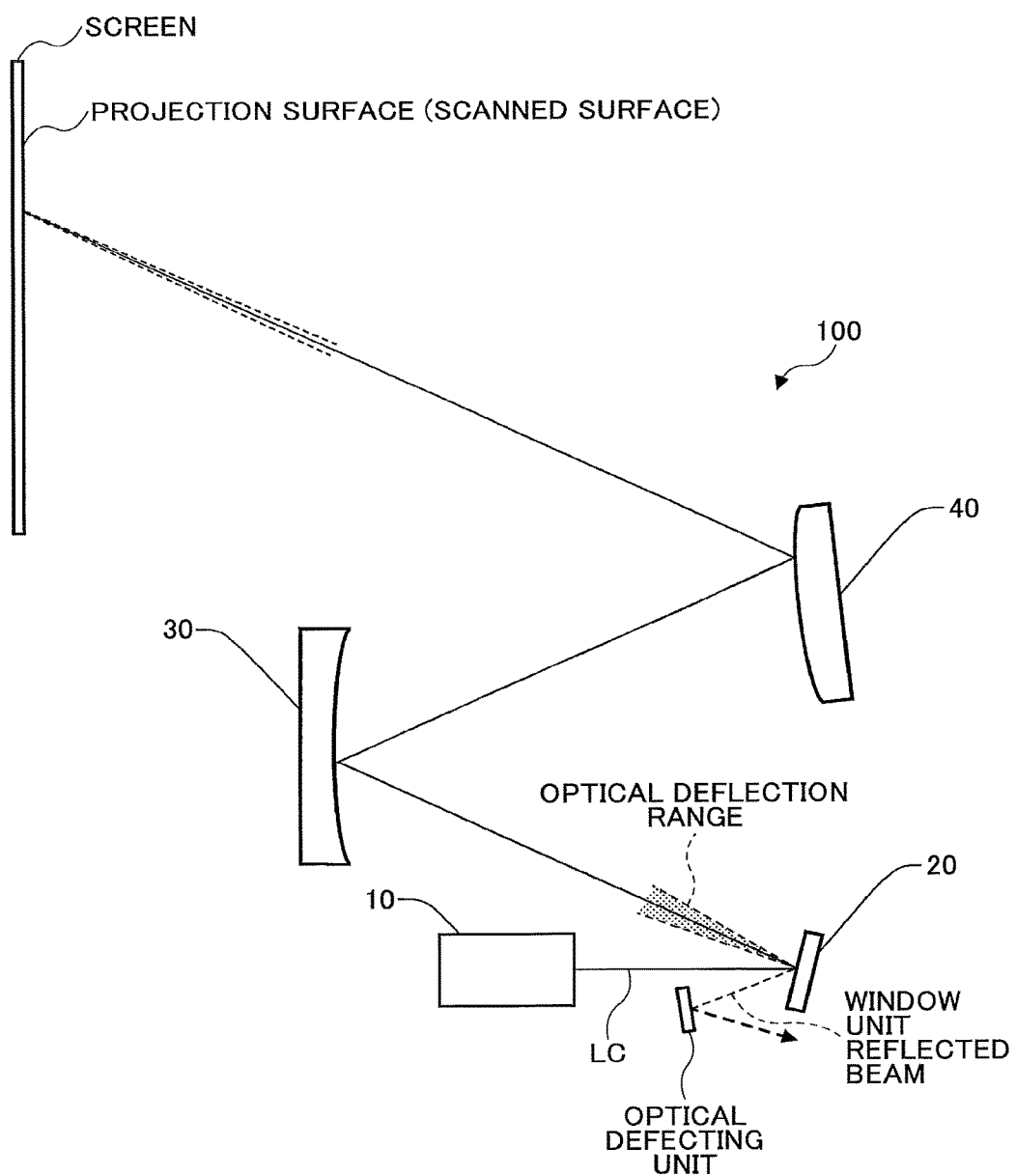
FIG. 10 is a diagram illustrating a projector in Variation 4.

In Variation 4 illustrated in FIG. 10, instead of the optical absorber in Variation 3, an optical deflecting unit, such as a reflection mirror or a light scatter, configured to change the travelling direction of the reflection beam is provided.

For example, in a case where a restriction in layout of optical components in the image displaying apparatus (e.g., a projector) makes it difficult to provide the optical absorber in the optical path of the beams reflected by the window unit, the optical deflecting unit is configured to change the travelling direction of the window unit reflection beams as illustrated in FIG. 10, and an optical absorber can be provided in a changed travelling direction to absorb the window unit reflection beam. In such a situation, the optical absorber may be arranged on an inner wall of the housing of the image forming apparatus, for example. In this case, the optical components reflected by the window unit are prevented from becoming stray beams and from reaching the image rendering area.

Figure 11:
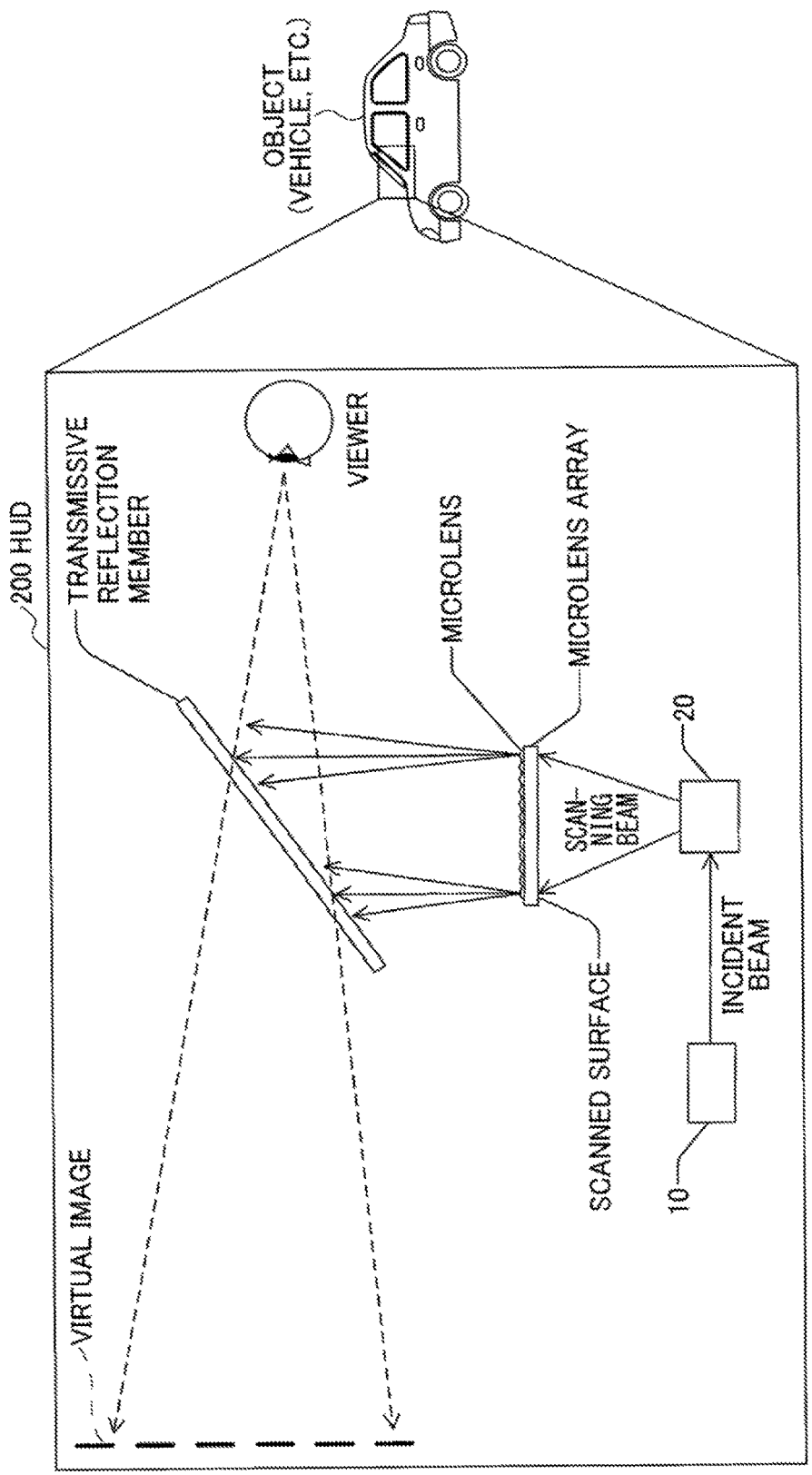
FIG. 11 schematically illustrates a configuration of a head-up display in Variation 5.

In the above-described embodiments and variations, the optical deflector is used in the projector serving as the image displaying apparatus. However, usage of the optical deflector is not limited to the above-described embodiments or variations. The optical deflector may be used in a head-up display 200 serving as the image displaying apparatus, as in Variation 5 illustrated in FIG. 11, for example. As shown in FIG. 11, the head-up display 200 may be installed in a movable object, for example, a vehicle, an airplane, or a vessel.

In detail, as illustrated in FIG. 11, as one example, the head-up display 200 includes: the optical source unit 10; the optical deflector 20 configured to deflect the laser beam that has been emitted from the optical source unit 10; a microlens array (a screen member) that is provided in an optical path of the laser beam (a scanning beam), which has been deflected by the optical deflector 20, and that includes a plurality of microlenses in a two-dimensional array; and a transmissive reflection member (e.g., a combiner) that is provided in the optical path of the laser beam through the microlens array. In such a configuration, the laser beam two-dimensionally scans the surface (the target surface) of the microlens array in accordance with the optical deflector optically deflecting the laser beam on X and Y axes, so as to create an image (an intermediate image) on the target surface. Then, the laser beams that have been formed into the images on the microlens array are incident to a transmissive reflection member, and part of the laser beams that have entered is reflected. Hence, a viewer is able to view a virtual image of the image (the intermediate image) formed on the microlens array via the transmissive reflection member.

Note that, instead of the microlens array, for example, another screen member, such as a transmissive screen, a reflection screen, or a diffuser panel having a fine concavo-convex structure on a surface, may be applicable. Additionally, for example, an optical system may be provided including, for example, a concave mirror, a flat mirror, or a convex mirror, for guiding the beam that has been formed into the image from the screen member to the transmissive reflection member. Further, the transmissive reflection member may be substituted with a window member (e.g., a front windshield) of a vehicle, an airplane, or a vessel. In other words, a head-up display may not necessarily include the transmissive reflection member as a component element.

Accordingly, a movable apparatus can be provided including: the head-up display 200; and a movable object (e.g., a vehicle, an airplane, or a vessel) in which the head-up display 200 is to be installed. In such a case, a viewer (e.g., a manipulator of the movable object) is able to view high-contrast virtual images formed on the screen member via the transmissive reflection member.

Heretofore, an apparatus (the head-up display) serving as the image displaying apparatus including the optical deflector 20 to be installed in the movable object has been described. The point is that the apparatus can be any apparatus to be installed in a physical body. Also in such a case, the same advantages as in the above-described embodiments and variations are available in the physical body and the image displaying apparatus to be installed in the physical body. In this case, the image displaying apparatus may include or may not necessarily include the transmissive reflection member as a component element. Note that examples of the "physical body" include a permanently installed object and a transportable object, in addition to a movable object.

Moreover, an image displaying apparatus, such as a head-mounted display or a prompter (a manuscript display device) including the optical deflector 20 can also be provided for enabling a viewer to visually recognize virtual images.

In the above-described embodiments and variations, a single optical deflector configured to two-dimensionally scan the target surface in two scanning directions (the main-scanning direction and the sub-scanning direction) orthogonal to each other is adopted. However, instead of such a single optical deflector, another single optical deflector that includes a mirror device with a mirror capable of oscillating in only one axis in a casing similar to the casing of the optical deflector 20 may be adopted for one-dimensionally scanning the target surface in one scanning direction. Additionally, two of the above another single optical deflectors may be used together to two-dimensionally scan the target surface in two scanning directions orthogonal to each other.

Each of the optical deflectors in the above-described embodiments and variations is applicable to an image forming apparatus, such as a printer, a copier, or an optical plotter, for forming a latent image by scanning, for example, a photoreceptor with light, so as to provide such an image forming apparatus. Also in this case, the same advantages as in the above-described embodiments and variations are available.

Figure 12:
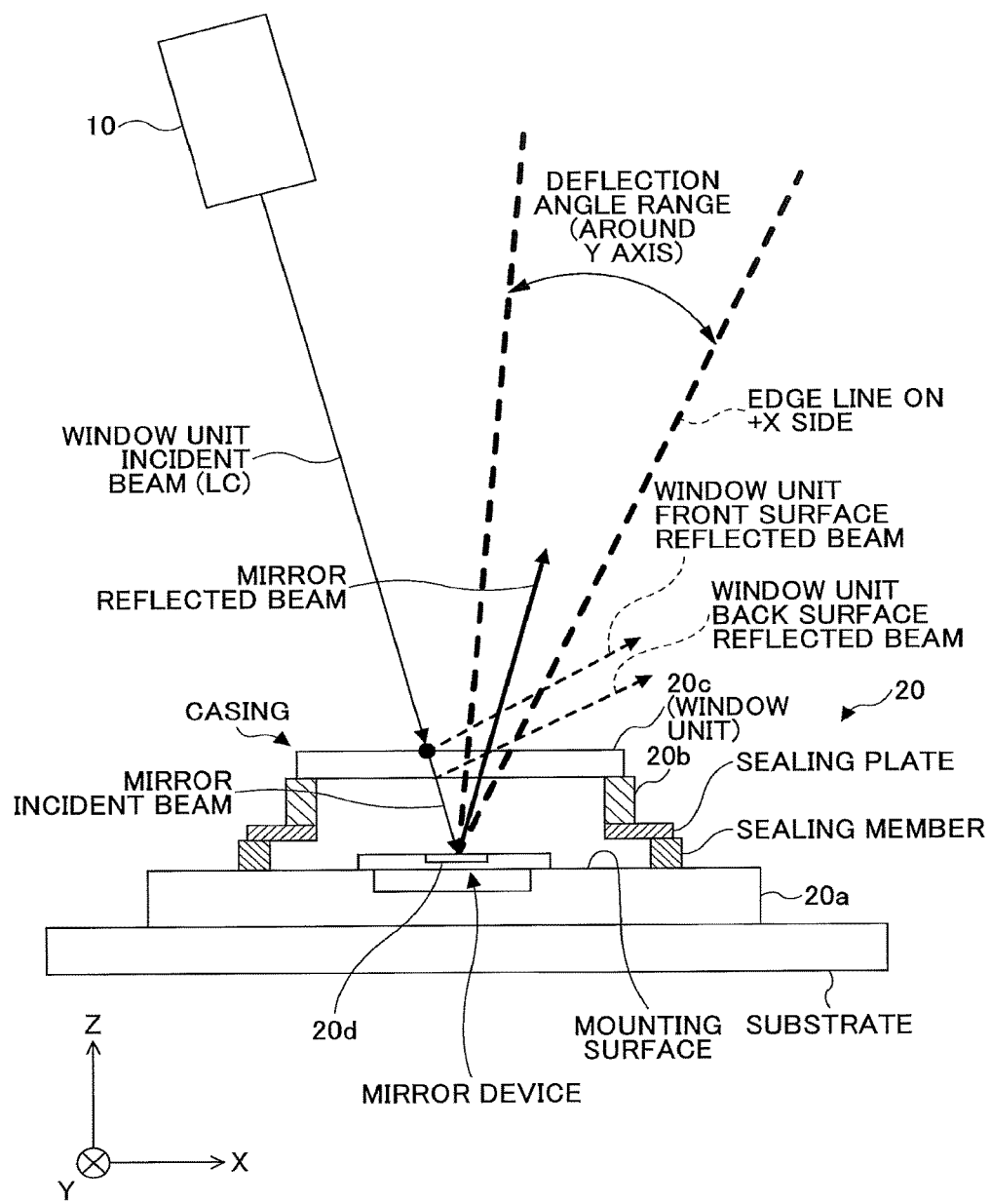
FIG. 12 is a diagram illustrating an optical deflector in Variation 6.

In the above-described embodiments and variations, the transmissive reflection structure is configured such that the optical path of the window unit incident beam, the optical path of the window unit front surface reflection beam, and the optical path of the window unit back surface reflection beam are designed to be formed on the same side (the −X side) with respect to the optical path of the mirror reflection beam, when viewed from the −Y direction. However, as in Variation 6 illustrated in FIG. 12, the above-described optical paths may be designed to be formed on different sides (opposite sides). That is, the window unit front surface reflection beam and the window unit back surface reflection beam may pass across the optical deflection range within which the beams that have been deflected by the mirror device travel. In detail, the transmissive reflection structure may be designed so that the optical path of the window unit front surface reflection beam and the optical path of the window unit back surface reflection beam pass across an edge line on the +X side of the deflecting angle range. Also in Variation 6, the optical absorber or the optical deflecting unit is desirably provided in the optical path of the window unit front surface reflection beam and in the optical path of the window unit back surface reflection beam. In a case where the optical deflecting unit is provided in the optical path of the window unit front surface reflection beam and in the optical path of the window unit back surface reflection beam, the optical absorber is desirably provided in optical paths of the beams that have been deflected by the optical deflecting unit.

Note that in the above-described Variation 6, the transmissive reflection structure is designed such that both the window unit front surface reflection beam and the window unit back surface reflection beam pass across the deflection range. However, only one of the window unit front surface reflection beam or the window unit back surface reflection beam may also be designed to pass across the deflection range.

Figure 13:
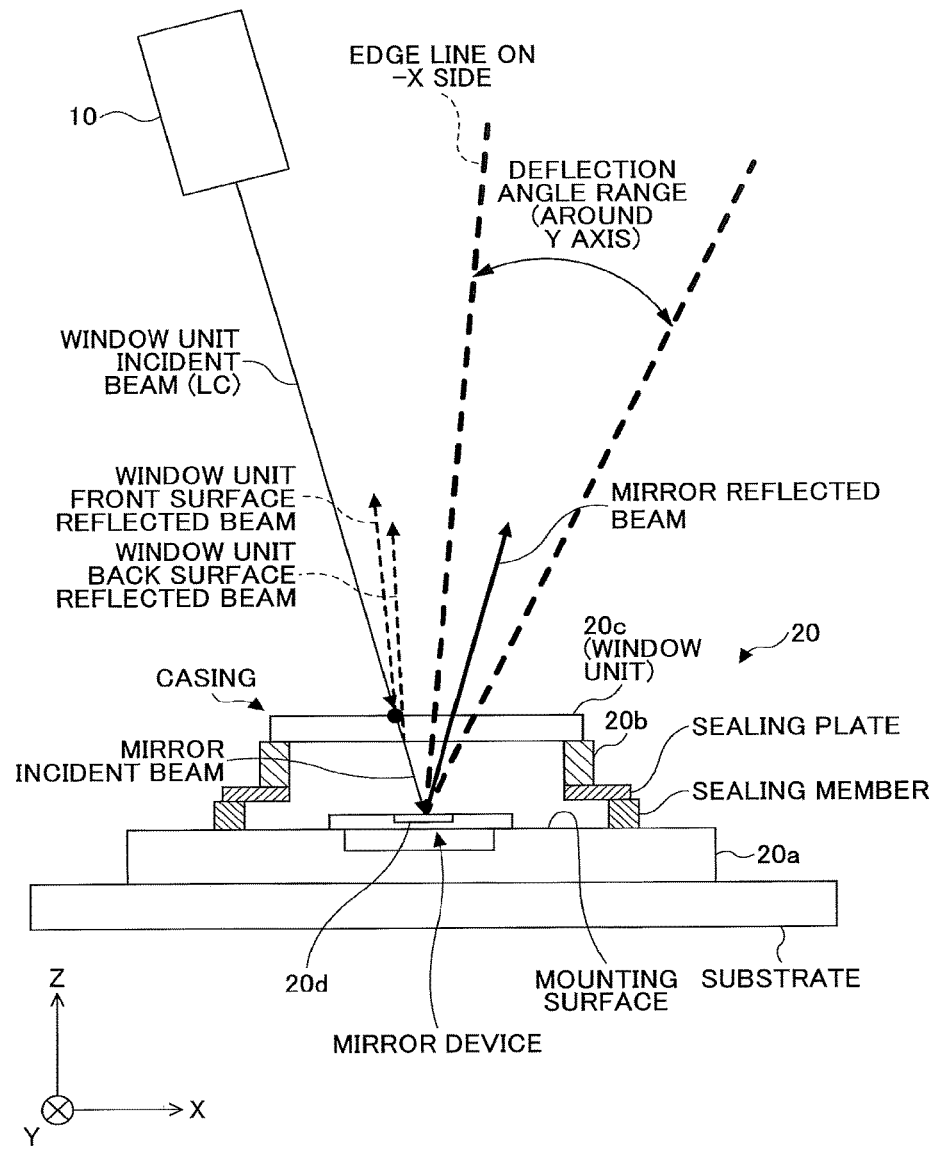
FIG. 13 is a diagram illustrating an optical deflector in Variation 7.

In the above-described embodiments and variations, the transmissive reflection structure is configured such that the optical path of the window unit front surface reflection beam and the optical path of the window unit back surface reflection beam are designed to be formed on the −X side of the optical path of the window incident beam and the deflection range, when viewed from the −Y direction. However, as in Variation 7 illustrated in FIG. 13, the optical path of the window unit front surface reflection beam and the optical path of the window unit back surface incident beam may also be designed to pass between the optical path of the window unit incident beam and the deflection range. In this case, however, in order to prevent the travelling directions of the window unit reflection beams from entering the deflection range, the transmissive reflection structure is desirably designed such that the reflection directions of the window unit reflection beams are arranged at least parallel to the edge line on the −X side of the deflection angle range in the Y axis, or are desirably arranged to be gradually away from the edge line. The transmissive reflection structure is desirably designed such that as the incident position of the incident beam at the window unit and the area in the window unit through which the mirror reflection beam passes approach each other, the mirror reflection beams become further away from the deflection range (for example, such that angles between the edge line on the −X side of the deflection angle range in the Y axis and the reflection directions of the window unit reflection beams become larger). Also in Variation 7, the optical absorber or the optical deflecting unit is desirably provided in the optical paths of the window unit reflection beams. In the case where the optical deflecting unit is provided in the optical paths of the window unit reflection beams, the optical absorber is desirably provided in the optical paths of the beams that have been deflected by the optical deflecting unit.

Note that in the above-described Variation 7, the transmissive reflection structure is designed so that the window unit front surface reflection beam and the window unit back surface reflection beam pass between the optical path of the window unit incident beam and the deflection range. However, only one of the window unit front surface reflection beam or the window unit back surface reflection beam may be designed to pass between the optical path of the window unit incident beam and the deflection range.

In the above-described embodiments and variations, the fine periodic pattern structure serving as a component element in the transmissive reflection structure is a blazed diffraction grating or a binary diffraction grating, which has a shape for creating a phase difference (an optical path difference) between adjacent diffraction structure units. However, the present disclosure is not limited to the above-described blazed diffraction grating or the binary diffraction grating. At least one diffraction structure may be provided. For example, any diffraction grating may be applicable where phase differences between adjacent parts are created with a shape of a sinusoidal diffraction grating or a step-shaped diffraction grating. Any diffraction grating may be applicable, as far as materials having different refractive indexes are alternatingly arranged. Different types of diffraction gratings may be provided on the window unit front surface and on the window unit back surface.

In the above-described embodiments and variations, the transmissive reflection structure is configured such that the reflection directions of at least part of the beams reflected by the window unit are separated from the deflection range in the X-axis direction (a direction corresponding to the sub-scanning direction). However, instead of the above configuration, the reflection directions of at least part of the beams reflected by the window unit may be separated from the deflection range in the Y-axis direction (a direction corresponding to the main-scanning direction), or may be separated from the deflection range in both of the X-axis and Y-axis directions. Note that in order to separate the optical path of at least part of the beams reflected by the window unit from the deflection range in the Y-axis direction, for example, the transmissive reflection structure may be configured such that the fine periodic pattern structure is aligned in the Y-axis direction and the beam emitted from the optical source unit 10 is made to be incident to the transmissive reflection structure from one side in the Y-axis direction.

In the above-described embodiments and variations, the cover glass is used as the window unit. However, the window unit is not limited to the cover glass. Any member that has an optical transparency may be applicable. The material of the window unit may be a resin, instead of a glass.

In the above-described embodiments and variations, a laser diode (LD) that is an edge-emitting laser is used as an optical source of an optical scanning device. However, the LD is not limited to the edge-emitting laser. For example, a Vertical Cavity Surface Emitting Laser (VCSEL) or any optical source other than lasers may be applicable.

Hereinafter, thinking processes of the inventors that have achieved the above-described embodiments and variations will be described.

In recent years, by using an optical deflector including an optical deflecting element (a mirror device) with a MEMS mirror, small-sized image displaying apparatuses have been produced. A laser is used as an optical source, and enables an operation at low-power consumption.

According to such advantages, laser scanning types of image displaying apparatuses are regarded as promising especially in applications of small-sized projectors, head-up displays to be installed in vehicles where an installation capacity is limited, and small-sized and light-weighted head-mounted displays.

In order to secure reliability under a high-temperature and high-humidity environment, the optical deflecting element that adopts the MEMS mirror is sealed in a hermetically sealed casing, in most cases. This configuration prevents, for example, a decrease in mirror reflection ratio caused by oxidation of a mirror material, scattering on a mirror surface caused by adherence of foreign matter, or short-circuiting of a wiring pattern.

The casing includes an optical transmissive window through which the laser beams are allowed to be transmitted. The size of the optical transmissive window is set so that an incident beam that enters the optical deflecting element and an optical beam deflected by the optical deflecting element transmit through the optical transmissive window without interfering with each other. The optical transmissive window is attached to tilt with respect to the optical deflecting element so that the beams reflected by the front and back surfaces of the optical transmissive window can be prevented from reaching an image rendering area.

In a case where the optical transmissive window tilts, however, the distance between the optical deflecting element and the optical transmissive window is increased. This also increases an area to be irradiated with a scanning beam on a plane where the optical transmissive window is provided. That is, the size of the optical transmissive window in increased.

To enlarge image rendering area on which the image displaying apparatus renders images and to improve resolutions of the images, an optical deflection range within which the beams that have been deflected by the optical deflecting element travel needs to be enlarged. In such a situation, however, to prevent the scanning beam from interfering with any other component element of the image displaying apparatus, such as a laser modulation optical system, the incident angle of the incident beam that enters the optical deflecting element also needs to be increased. That is, in a case of adopting a method for tilting the optical transmissive window to prevent the beams reflected by the surface of the optical transmissive window from becoming the stray beams, the tilt angle of the optical transmissive window is drastically increased.

Hence, the distance between the optical deflecting element and the optical transmissive window is further increased, and the size of the optical transmissive window is noticeably increased. Even when the optical deflecting element itself has a small size, an increase in size of the casing for sealing increases the size of the optical deflector. Further, the restrictions in an optical design layout make it impossible to avoid an increase in size of the entire image displaying apparatus. Such increased sizes of components will lead to another drawback of increased component costs.

The beam scanning type of image displaying apparatus in the related art has a drawback as described above in that it might be difficult to enable both an increase in the image rendering area and higher-resolutions of the images, and down-scaling of the image displaying apparatus, which is an advantage of the beam scanning type of image displaying apparatus.

Hence, the inventors have achieved the beam scanning type of image displaying apparatus in the above-described embodiments and variations, for the purpose of providing an optical deflector, in which the beams reflected by the optical transmissive window of the optical deflector are prevented from becoming stray beams on the rendered images, and an increase in size is prevented even when the image rendering area is increased.

What is claimed is:

1. An optical deflector used for optically scanning a target surface, the optical deflector comprising:
    a mirror device configured to include a mirror configured to oscillate; and
    a casing configured to include a window unit for facing the mirror device, and to accommodate the mirror device,
    wherein the window unit has a transmissive reflection structure in which part of an incident beam is caused to transmit through the window unit toward the mirror, and at least part of a remainder of the incident beam is reflected by the window unit to a direction separated from an optical deflection range that is deflected by the mirror device,
    wherein the transmissive reflection structure includes a diffraction grating provided on one of a front surface and a back surface of the window unit, and
    wherein the diffraction grating is provided in an area of the window unit through which the part of the incident beam passes, and is not provided in another area of the window unit through which the deflected beam that has been deflected by the mirror device passes.

2. The optical deflector according to claim 1, wherein the transmissive reflection structure further includes a diffraction grating provided on the other one of the front surface and the back surface of the window unit, and
    wherein the diffraction gratings respectively provided on the front surface and the back surface have different diffraction angles from each other.

3. The optical deflector according to claim 1,
    wherein the transmissive reflection structure further includes a diffraction grating provided on the other one of the front surface and the back surface of the window unit,
    wherein antireflection films are respectively provided on the front surface and the back surface, and
    wherein the diffraction gratings are respectively provided on the antireflection films.

4. The optical deflector according to claim 1, wherein the diffraction grating has a blazed structure.

5. The optical deflector according to claim 1, wherein the diffraction grating has a binary structure.

6. The optical deflector according to claim 1, wherein the window unit is parallel to a surface on which the mirror device is mounted, in the casing.

7. The optical deflector according to claim 1, wherein an optical path of a reflected beam that has been reflected by the transmissive reflection structure is formed on a side opposite the optical deflection range with respect to an optical path of the incident beam.

8. An image displaying apparatus configured to optically scan a scanned surface, and to display an image, the image displaying apparatus comprising:
    an optical source unit configured to emit a beam based on image information; and
    the optical deflector of claim 1, configured to deflect the beam emitted from the optical source unit.

9. The image displaying apparatus according to claim 8, further comprising an optical absorber provided in an optical path of a reflected beam that has been reflected by the transmissive reflection structure.

10. The image displaying apparatus according to claim 8, further comprising an optical deflecting unit provided in an optical path of a reflected beam that has been reflected by the transmissive reflection structure.

11. The image displaying apparatus according to claim 10, further comprising an optical absorber provided in an optical path of the reflected beam that has been deflected by the optical deflecting unit.

12. The image displaying apparatus according to claim 8, further comprising an optical system configured to guide the beam that has been formed into the image on the scanned surface to a transmissive reflection member.

13. An object apparatus comprising:
    the image displaying apparatus of claim 12; and
    an object in which the image displaying apparatus is installed.

* * * * *